United States Patent
Simon et al.

(10) Patent No.: US 10,287,504 B2
(45) Date of Patent: *May 14, 2019

(54) COMPOSITION THAT FORMS AN INSULATING LAYER AND USE THEREOF

(71) Applicant: Hilti Aktiengesellschaft, Schaan (LI)

(72) Inventors: Sebastian Simon, Buchloe Lindenberg (DE); Armin Pfeil, Kaufering (DE); Thomas Buergel, Landsberg am Lech (DE); Angela Muecke, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 343 days.

This patent is subject to a terminal disclaimer.

(21) Appl. No.: 14/652,700

(22) PCT Filed: Dec. 10, 2013

(86) PCT No.: PCT/EP2013/076094
§ 371 (c)(1),
(2) Date: Jun. 16, 2015

(87) PCT Pub. No.: WO2014/095491
PCT Pub. Date: Jun. 26, 2014

(65) Prior Publication Data
US 2015/0299578 A1    Oct. 22, 2015

(30) Foreign Application Priority Data

Dec. 18, 2012 (DE) .......................... 10 2012 223 513

(51) Int. Cl.
C09K 21/14 (2006.01)
C09D 5/18 (2006.01)
C09D 5/00 (2006.01)

(52) U.S. Cl.
CPC ................ *C09K 21/14* (2013.01); *C09D 5/00* (2013.01); *C09D 5/185* (2013.01)

(58) Field of Classification Search
None
See application file for complete search history.

(56) References Cited

U.S. PATENT DOCUMENTS

| 3,562,197 | A | * | 2/1971 | Sears et al. | ............ | C01B 25/405 |
| | | | | | | 106/18.15 |
| 3,969,291 | A | * | 7/1976 | Fukuba | .................... | C09D 5/18 |
| | | | | | | 260/DIG. 24 |
| 4,145,479 | A | | 3/1979 | Adams et al. | | |
| 4,442,157 | A | * | 4/1984 | Marx | ........................ | C08L 61/06 |
| | | | | | | 252/602 |
| 4,604,295 | A | | 8/1986 | Humphreys | | |
| 4,616,826 | A | | 10/1986 | Trefts | | |
| 5,236,967 | A | * | 8/1993 | Ohkawa | ............... | C08F 299/022 |
| | | | | | | 522/100 |
| 5,441,776 | A | | 5/1995 | Schmidt et al. | | |
| 6,447,708 | B1 | * | 9/2002 | Thepot | .................. | C07C 319/18 |
| | | | | | | 264/496 |
| 8,128,999 | B2 | | 3/2012 | Ghahary et al. | | |
| 2002/0091214 | A1 | | 7/2002 | Waanders et al. | | |
| 2004/0256605 | A1 | * | 12/2004 | Reinheimer | ............. | C08K 9/02 |
| | | | | | | 252/606 |
| 2007/0270548 | A1 | * | 11/2007 | Bojkova | ............ | C08G 18/3234 |
| | | | | | | 525/123 |
| 2008/0125525 | A1 | * | 5/2008 | Bojkova | ............ | C08G 18/3234 |
| | | | | | | 524/114 |
| 2011/0143061 | A1 | * | 6/2011 | Thiemann | ............... | C08G 59/66 |
| | | | | | | 428/34.1 |
| 2011/0311830 | A1 | | 12/2011 | Wade | | |
| 2012/0315417 | A1 | | 12/2012 | Pfeil | | |
| 2012/0322928 | A1 | * | 12/2012 | Jansen | ..................... | C04B 26/06 |
| | | | | | | 524/302 |
| 2015/0299578 | A1 | * | 10/2015 | Simon | ...................... | C09D 5/00 |
| | | | | | | 252/606 |

FOREIGN PATENT DOCUMENTS

| DE | 2903499 | 1/1980 |
| DE | 199 56 509 | 1/2001 |
| DE | 10 2011 077 248 B1 | 9/2012 |
| EP | 138 546 A1 | 4/1985 |
| EP | 139 401 A1 | 5/1985 |
| EP | 1489136 A1 | 12/2004 |
| EP | 2336214 | 6/2011 |
| GB | 755 551 A | 8/1956 |
| GB | 2 007 689 A1 | 5/1979 |
| WO | WO 99/51663 | 10/1999 |
| WO | WO 2005/100436 | 10/2005 |
| WO | WO 2007/042199 A1 | 4/2007 |
| WO | WO2007131145 | 11/2007 |
| WO | WO2009/010423 | 1/2009 |
| WO | WO2011/064360 | 6/2011 |

\* cited by examiner

*Primary Examiner* — Joseph D Anthony
(74) *Attorney, Agent, or Firm* — Davidson, Davidson & Kappel, LLC

(57) ABSTRACT

A composition that forms an insulating layer is described, which contains a thiol-ene-based binder. With the composition according to the invention, the expansion rate of which is relatively high, coatings having the layer thickness necessary for the respective fire resistance time can be applied simply and quickly, the layer thickness being reduced to a minimum and a highly insulating effect still being achieved. The composition according to the invention is particularly suitable for fire protection, in particular as a coating of metallic and/or non-metallic substrates, for example steel components such as pillars, beams or truss members, to increase the fire resistance time.

16 Claims, No Drawings

COMPOSITION THAT FORMS AN INSULATING LAYER AND USE THEREOF

The present invention relates to an insulating layer-forming composition, in particular a composition having intumescent properties, which contains a thiol-ene-based binding agent, and to the use thereof for fire protection, in particular for coating components, such as pillars, supports or frame members, for increasing the fire resistance duration.

BACKGROUND

Insulating layer-forming compositions, also called intumescent compositions, are generally applied to the surface of components for the purpose of forming coatings, in order to protect the components from fires or against extreme heat exposure due, for example, to a fire. Steel structures are now an inherent part of modern architecture, even if they have a distinct disadvantage as compared to reinforced concrete steel construction. Above approximately 500° C., the load-bearing capacity of steel drops by 50%, i.e., the steel loses its stability and its load-bearing capacity. This temperature may already be reached after approximately 5 to 10 minutes, depending on the fire load, for example, in the case of direct exposure to fire (approximately 1,000° C.), which frequently results in a loss of load-bearing capacity of the structure. The goal of fire protection, in particular of steel fire protection in the event of fire, is to prolong as long as possible the time span up to the loss of the load-bearing capacity of a steel structure, in order to save human lives and valuable assets.

For this purpose, the building codes of many countries require corresponding fire resistance times for particular buildings made of steel. They are defined by so-called F-classes, such as F 30, F 60, F 90 (fire resistance classes according to DIN 4102-2) or American classes according to ASTM, etc. F 30, for example, according to DIN 4102-2 means that in the event of fire, a supporting steel structure under standard conditions must be able to withstand the fire for at least 30 minutes. This is normally achieved in that the heating rate of the steel is slowed, for example, by covering the steel structure with insulating layer-forming coatings. This involves painted coats, the components of which expand in the event of fire, while forming a solid microporous carbon foam. Formed in the process is a fine-pored and thick foam layer, the so-called ash crust, which, depending on the composition, is highly heat insulating and thus slows the heating of the component, so that the critical temperature of approximately 500° C. is reached at the earliest after 30, 60, 90, 120 minutes or up to 240 minutes. Essential for the achievable fire resistance is invariably the layer thickness of the coating applied or the ash crust produced by it. Closed profiles, such as pipes, given comparable solidity, require approximately double the amount as compared to open profiles, such as supports having a double-T profile. In order to adhere to the required fire resistance times, the coatings must have a certain thickness and, when exposed to heat, must be capable of forming an advantageously voluminous and therefore well-insulating ash crust, which remains mechanically stable for the duration of the fire load.

There exist various systems in the prior art for such purpose. Essentially, a distinction is drawn between 100% systems and solvent-based or water-based systems. In solvent-based systems or water-based systems, binding agents, usually resins, are applied as a solution, dispersion or emulsion to the components. These may be implemented as single component systems or multi-component systems. The solvent or water, once it is applied, evaporates and leaves behind a film which dries over time. A further distinction may be drawn in this case between systems, in which the coating essentially no longer changes during drying, and systems in which, after evaporation, the binding agent cures primarily as the result of oxidation reactions and polymerization reactions, which are induced, for example, by the oxygen from the atmosphere. The 100% systems contain the components of the binding agent without a solvent or water. They are applied to the component, the "drying" of the coating taking place merely by reacting the binding agent components with one another.

The solvent-based systems or water-based systems have the disadvantage that the drying times, also called curing times, are long and, moreover, multiple layers must be applied, i.e., require multiple work steps, in order to achieve the required layer thickness. Since each individual layer must be correspondingly dried prior to application of the next layer, the result is more hours of labor and correspondingly high costs on the one hand, and a delay in the completion of the building structure, since in part several days pass, depending on the climatic conditions, before the required layer thickness is applied. Also disadvantageous is the fact that because of the required layer thickness, the coating may tend to form cracks and to peel during drying or when exposed to heat, as a result of which, in the worst case, the subsurface is partially exposed, in particular in systems in which the binding agent does not re-harden after the solvent or the water evaporates.

In order to overcome this disadvantage, epoxy-amine-based two-component systems or multi-component systems have been developed, which involve almost no solvents, so that a curing occurs significantly more rapidly and, in addition, thicker layers may be applied in one work step, so that the required layer thickness is built up significantly more rapidly. However, these systems have the disadvantage that the binding agent forms a very stable and rigid polymer matrix, often with a high softening range, which inhibits the formation of foam by the foaming agent. For this reason, thick layers must be applied in order to produce a sufficient foam thickness for the insulation. This, in turn, is disadvantageous, since it requires a large amount of material. To be able to apply these systems, processing temperatures of up to +70° C. are frequently required, which makes the application of such systems labor-intensive and their installation costly. Moreover, some of the binding agent components used are toxic or otherwise problematic (for example, irritating, caustic), such as, for example, the amines or amine mixtures used in the epoxy-amine systems.

SUMMARY OF THE INVENTION

It is an object of the present invention to provide a coating system of the aforementioned kind, which avoids the aforementioned disadvantages, which is, in particular not solvent-based or water-based and exhibits a rapid curing, is simple to apply due to properly matched viscosity, and requires only a small layer thickness due to the high intumescence, i.e., the formation of an effective ash crust layer.

The present invention provides an insulating layer-forming composition, including a component A, which contains at least one compound having one or multiple reactive carbon multiple bonds, such as a C—C— double bond or a C—C— triple bond, per molecule, and optionally at least one reactive diluent, including a component B, which includes at least one thio-functionalized compound, the average number of thiol groups of which per molecule is at least 2, and which contains a radical initiator, and including a constituent C, which contains an insulating layer-forming additive.

With the composition, it is possible to apply coatings having the required layer thickness for the respective fire resistance duration in a simple and rapid manner. The advantages achieved by the present invention are essentially that due to the packaging of the composition as a two-component or multi-component system, and due to the rapid curing times inherent to the multi-component systems based on radically polymerizable resins, it is possible to significantly reduce the working time. Unlike the epoxy-amine systems, an application without heating the composition, for example, via the widely used airless spray method, is possible due to the low viscosity of the composition in the area of application, adjusted using suitable thickener systems.

An additional advantage is that compounds hazardous to health and subject to labeling such as, for example, critical amine compounds, may be largely dispensed with.

Due to the lower softening range of the polymer matrix as compared to the epoxy-based systems, the intumescence is relatively high in terms of the expansion rate, so that a strong insulating effect is achieved even with thin layers. Material expenditure drops accordingly, which has a favorable impact on material costs, in particular in the case of large-area application. This is achieved, in particular by using a reactive system, which does not physically dry and thus sustains no loss of volume as a result of the drying of solvents or of water in the case of water-based systems, but rather hardens radically. A solvent content of approximately 25% is therefore typical in a classical system. This means that of a 10-mm layer, only 7.5 mm remains as the actual protective layer on the substrate to be protected. In the composition according to the present invention, more than 96% of the coating remains on the substrate to be protected. In addition, the relative ash crust stability is very high due to the structure of the foam formed in the event of fire.

Compared to solvent-based systems or water-based systems when applied without an undercoating, the compositions according to the present invention exhibit excellent adhesion to different metallic and non-metallic substrates, as well as excellent cohesion and impact resistance.

For a better understanding of the present invention, the following explanations of the terminology used herein are considered useful. As provided in the present invention:

a "reactive C—C double bond or C—C triple bond" is a C—C double bond or C—C triple bond, which is non-aromatic.

"chemical intumescence" means the formation of a voluminous, insulating ash layer by compounds matched to one another, which react with one another when exposed to heat;

"physical intumescence" means the formation of a voluminous, insulating ash by expansion of a single compound, which releases gases when exposed to heat, without a chemical reaction between two compounds having taken place, as a result of which the volume of the compounds increases by a multiple of the original volume;

"insulating layer-forming" means that in the event of fire, a solid microporous carbon foam forms, so that, depending on the composition, the formed, fine-pored and thick foam layer, the so-called ash crust, insulates a substrate from heat.

"carbon source" is an organic compound which, as a result of incomplete combustion, leaves behind a carbon skeleton and does not fully combust to form carbon dioxide and water (carbonification); these compounds are also referred to as "carbon skeleton formers";

an "acidifier" is a compound which forms a non-volatile acid when exposed to heat, i.e., above approximately 150° C., for example, through decomposition; in addition, as a result acts as a catalyst for the carbonification; in addition, it may assist in lowering the viscosity of the melt of the binding agent; the term "dehydrogenation catalyst" is used synonymously in this regard.

a "propellant" is a compound which decomposes at increased temperatures while forming inert, i.e., non-combustible gases, and expands the carbon skeleton formed by carbonification and, optionally, the softened binding agent to form a foam (intumescence); this term is used synonymously with "gas former";

an "ash crust stabilizer" is a so-called skeleton-forming compound, which stabilizes the carbon skeleton (ash crust) formed from the interaction of the carbon formation from the carbon source and the gas from the propellant, or from the physical intumescence. The principle mechanism in this case is that the carbon layers forming very softly per se are mechanically solidified by inorganic compounds. The addition of such an ash crust stabilizer contributes to an essential stabilization of the intumescent crust in the event of fire, since these additives enhance the mechanical strength of the intumescent layer and/or prevent it from draining off.

"reactive diluents" are liquid or low-viscosity compounds (resins), which dilute other compounds (resins) having a higher viscosity and thereby impart the viscosity necessary for their application, which contain functional groups capable of reacting with the base resin and during polymerization (hardening) become largely a component of the hardened composition.

a "radical initiator" is a radical source, which decays induced by radiation, thermally or with the aid of a catalyst (accelerator) while forming radicals;

"(meth)acryl . . . / . . . (meth)acryl . . . " means that both the "methacryl . . . / . . . methacryl . . . "- and the "acryl . . . / . . . acryl . . . " compounds are to be included;

A compound having at least one C—C double bond or at least one C—C triple bond, which may radically harden and has sufficient storage stability due to the missing homopolymerization, is advantageously used as a compound having reactive carbon multiple bonds. Suitable compounds are described in WO 2005/100436 A1 and WO 2007/042199 A1, the contents of which are incorporated by reference in this application.

According to one preferred specific embodiment of the present invention, the compound having reactive carbon multiple bonds is a compound having at least one non-aromatic C—C double bond, such as (meth)acrylate-functionalized compounds, allyl-functionalized compounds, vinyl-functionalized compounds, norbornene-functionalized compounds and unsaturated polyester compounds.

Examples of unsaturated polyester compounds may be found in the article by M. Maik, et al., *J. Macromol. Sci., Rev. Macromol. Chem. Phys.* 2000, C40, 139-165, in which a classification of such compounds was made based on their structure, five groups being named: (1) ortho-resins, (2) iso-resins, (3) bisphenol-A fumarates, (4) chlorendics, and (5) vinylester resins. These may be further differentiated from the so-called dicyclopentadiene (DCPD) resins.

The compound having reactive carbon multiple bonds further preferably includes alkyl-, vinyl-, (meth)acryl-, fumaric acid-, maleic acid-, itaconic acid-, crotonic acid- or cinnamic acid double bond units, or the compound having reactive carbon multiple bonds is a Diels-Alder adduct or a norbornene derivative thereof, or a derivative thereof having another compound, which carries bicyclic double bonds.

Exemplary compounds are vinyl ester, allyl ester, vinyl ether, allyl ether, vinyl amines, allyl amines, vinyl amides, esters and amides of (meth)acrylic acid, esters of fumaric acids and maleimides.

The unsaturated compound selected from the group consisting of trimethylolpropane diallylether, pentaerythritol triallylether, pentaerythritol triacrylate, trimethylolpropane triacrylate, trimethylolpropane diallyl ether, phthalic acid diallylester, succinyl acid diallylester, succinic acid bis[4-(vinyloxy)butyl]ester, adipic acid bis[4-(vinyloxy)butyl]ester, isophthalic acid bis[4-(vinyloxy)butyl]ester, terephthalic acid bis[4-(vinyloxy)butyl]ester, trimellitic acid tris[4-(vinyloxy)butyl]ester, diethyleneglycol divinylether, 1,4-cyclohexanedimethanol divinylether, 1,4-butanediol divinylether, pentaerythritol allylether, 1,3,5-triallyl-1,3,5-triazine-2,4,6-trione and triallylamine is particularly preferred.

Particularly preferably used as a compound having reactive carbon multiple bonds, are compounds which are liquid or include a low base viscosity ($\eta < 50$ Pas (T=23° C.; $\gamma = 100$ s$^{-1}$)), in order to ensure the low viscosity of the filled composition. The addition of a reactive diluent is necessary in the case of higher viscosity or high viscosity compounds, so that the viscosity of the composition on the whole remains low in the pumping and spraying shearing zone.

In one specific embodiment of the present invention, the composition thus contains additional low-viscosity compounds as reactive diluents, in order to adjust the viscosity of the composition, if necessary. Reactive diluents used may be low-viscosity compounds, as a pure substance or in a mixture, which react with the components of the composition. Examples are allylether, allylester, vinylether, vinylester, (meth)acrylic acid ester and thiol-functionalized compounds. Reactive diluents are preferably selected from the group consisting of allylethers, such as allylethylether, allylpropylether, allylbutylether, allylphenylether, allylbenzylether, trimethylolpropane allylether, allylesters, such as acetic acid allylester, butyric acid allylester, maleic acid allylester, allylacetoacetate, vinylethers, such as butylvinylether, 1,4-butanediolvinylether, tert-butylvinylether, 2-ethylhexylvinylether, cyclohexylvinylether, 1,4-cyclohexanedimethanolvinylether, ethyleneglycolvinylether, diethyleneglycolvinylether, ethylvinylether, isobutylvinylether, propylvinylether, ethyl-1-propenylether, dodecylvinylether, hydroxylpropyl(meth)acrylate, 1,2-ethanedioldi(meth)acrylate, 1,3-propanedioldi(meth)acrylate, 1,2-butanedioldi(meth)acrylate, 1,4-butanedioldi(meth)acrylate, trimethylolpropanetri(meth)acrylate, phenethyl(meth)acrylate, tetrahydrofurfuryl(meth)acrylate, ethyltriglycol(meth)acrylate, N,N-dimethylaminoethyl(meth)acrylate, N,N-diethylaminomethyl(meth)acrylate, acetoacetoxyethyl(meth)acrylate, isobornyl(meth)acrylate, 2-ethylhexyl(meth)acrylate, diethyleneglycoldi(meth)acrylate, methoxypolyethylene glycolmono(meth)acrylate, trimethylcyclohexyl(meth)acrylate, 2-hydroxyethyl(meth)acrylate, dicyclopentenyloxyethyl(meth)acrylate and/or tricyclopentadienyldi(meth)acrylate, bisphenol-A-(meth)acrylate, novolakepoxidi(meth)acrylate, di-[(meth)acryloyl-maleoyl]-tricyclo-5.2.1.0.$^{2.6}$-decane, dicyclopentenyloxyethyl-crotonate, 3-(meth)acryloyl-oxymethyl-tricylo-5.2.1.0.$^{2.6}$-decane, 3-(meth)cyclopentadienyl(meth)acrylate, isobornyl (meth)acrylate and decalyl-2-(meth)acrylate.

In principle, other conventional compounds having reactive double bonds may be used, alone or in a mixture, with the (meth)acrylic acid esters, for example, styrene, α-methylstyrene, alkylated styrenes, such as tert-butylstyrene, divinylbenzene and allyl compounds.

Depending on the functionality of the unsaturated compound, the degree of cross-linking of the binding agent, and thus the stability of the resultant coating as well as its elastic properties, may be adjusted. As the same time, this has a direct influence on the achievable expansion of the resultant ash crust in the event of fire.

In one preferred specific embodiment of the present invention, the compound having one or multiple reactive C—C double bonds or C—C triple bonds per molecule also contains a compound for preventing the premature polymerization of the unsaturated compound, the so-called stabilizer. Suitable stabilizers according to the present invention are stabilizers normally used for radically polymerizable bonding as they are known to those skilled in the art. The stabilizers are preferably selected from among phenolic compounds and non-phenolic compounds, such as stable radicals and/or phenothiazines.

Phenolic inhibitors under consideration, which are often a component of commercial, radically hardening reaction resins, are phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzol, 2,2'-methylene-di-p-cresol, pyrocatechol and butylpyrocatechols, such as 4-tert-butylpyrocatechol, 4,6-di-tert-butylpyrocatechol, hydroquinones, such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, Benzoquinone, 2,3,5,6-tetrachlorine-1,4-benzoquinone, methylbenzoquinone, 2,6-dimethylbenzoquinone, naphthoquinone, or mixtures of two or more thereof.

Non-phenolic or anaerobic inhibitors effective also without oxygen under consideration, i.e., in contrast to the phenolic inhibitors, are preferably phenothiazines, such as phenothiazine and/or derivatives or combinations thereof, or stable organic radicals, such as galvinoxyl- and N-oxyl radicals.

N-oxylradicals, such as those described in DE 199 56 509, for example, may be used. Suitable stable N-oxylradicals (nitroxylradicals) may be selected from among 1-oxyl-2,2,6,6-tetramethylpiperidine, 1-oxyl-2,2,6,6-tetramethylpiperidine-4-ol (also referred to as TEMPOL), 1-oxyl-2,2,6,6-tetramethylpiperidine-4-on (also referred to a TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL), aluminum-N-nitrosophenylhydroxylamine, diethylhydroxylamine. There are also suitable N-oxyl compounds oximes, such as acetaldoxime, acetoxime, methylethylketoxime, salicyloxime, benzoxime, glyoximes, dimethylglyoxime, acetone-O-(benzyloxycarbonyl)oxime or pyrimidinol- or pyridinol-compounds substituted in para-position for the hydroxyl group, as they are described in the previously published patent specification DE 10 2011 077 248 B1, and the like.

The inhibitors may be used alone or in a combination of two or more thereof.

Any compound having at least two thiol groups may be advantageously used as a thio-functionalized compound. Each thiol group in this case is attached to a skeleton either directly or via a linker, whereby the thiol-functionalized compound according to the present invention may have a wide variety of skeletons, whereby these may be identical or may differ.

According to the present invention, the skeleton is a monomer, an oligomer or a polymer.

In some specific embodiments of the present invention, the skeletons include monomers, oligomers or polymers having a molecular weight (Mw) of 50,000 g/mol or less, preferably 25,000 g/mol or less, more preferably 10,000 g/mol or less, even more preferably 5,000 g/mol or less, even more preferably 2,000 g/mol or less, and most preferably 1,000 g/mol or less.

Alkanediols, alkylene glycols, sugar, polyvalent derivatives thereof or mixtures thereof and amines, such as ethylene diamine and hexamethylene diamine, and thiols, for example, may be mentioned as monomers suitable as skeletons. The following may be mentioned by way of example as oligomers or polymers suitable as skeletons: polyalkylene oxide, polyurethane, polyethylene vinyl acetate, polyvinyl alcohol, polydiene, hydrogenated polydiene, alkyde, alkyde polyester, (meth)acryl polymer, polyolefine, polyester, halogenated polyolefine, halogenated polyester, polymercaptane, as well as copolymers or mixtures thereof.

In preferred specific embodiments of the present invention, the skeleton is a polyvalent alcohol or a polyvalent amine, whereby these may be monomers, oligomers or polymers. The skeleton is more preferably a polyvalent alcohol.

The following may be mentioned by way of example as polyvalent alcohols suitable as skeletons: alkanediols, such as butanediol, pentanediol, hexanediol, alkylene glycols, such as ethylene glycol, propylene glycol and polypropylene glycol, glycerin, 2-(hydroxyl methyl)propane-1,3-diol, 1,1,1,-tris(hydroxymethyl)ethane, 1,1,1-trimethylolpropane, di(trimethylolpropane), tricyclodecane dimethylol, 2,2,4-trimethyl-1,3-pentanediol, bisphenol A, cyclohexane dimethanol, alkoxylated and/or ethoxylated and/or propoxylated derivatives of neopentyl glycol, tertraethylene glycol cyclohexanedimethanol, hexanediol, 2-(hydroxymethyl)propane-1,3-diol, 1,1,1-tris(hydroxymethyl)ethane, 1,1,1-trimethylolpropane and castor oil, pentaerythritol, sugar, polyvalent derivatives thereof or mixtures thereof.

Any units suitable for binding skeleton and functional groups may be used as linkers. For thiol-functionalized compounds, the linker is preferably selected from among the structures (I) through (XI).

1: Bond for functional group
2: Bond for skeleton

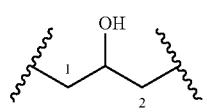

(I)

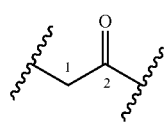

(II)

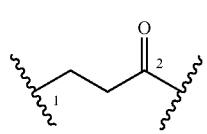

(III)

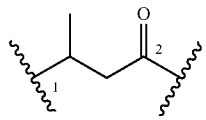

(IV)

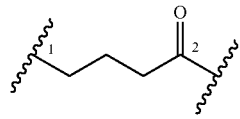

(V)

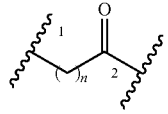

(VI)

$4 <= n <= 10$

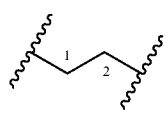

(VII)

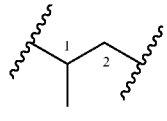

(VIII)

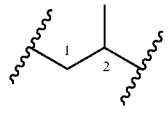

(IX)

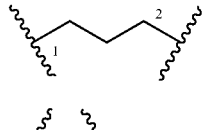

(X)

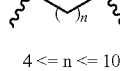

(XI)

$4 <= n <= 10$

The structures (I), (II), (III) and (IV) are particularly preferred as linkers for thiol-functionalized compounds.

The thiol group (—SH) is the functional group for thiol-functionalized compounds.

Particularly preferred thiol-functionalized compounds are esters of α-thioacetic acid (2-mercaptoacetate), β-thiopropionic acid (3-mercaptopropionate) and 3-thiobutryic acid (3-mercaptobutyrate) having monoalcohols, diols, triols, tetraols, pentaols or other polyols, such as 2-hydroxy-3-mercaptopropyl derivatives of monoalcohols, diols, triols, tetraols, pentaols or other polyols. Mixtures of alcohols may also be used as a basis for the thiol-functionalized compound. In this respect, reference is made to the WO 99/51663 A1 publication, the contents of which are incorporated by reference in this application.

Particularly suitable examples of thiol-functionalized compounds which may be mentioned are: glycol-bis(2-mercaptoacetate), glycol-bis(3-mercaptopropionate), 1,2-propylene glycol-bis(2-mercaptoacetate), 1,2-propylene glycol-bis(3-mercaptopropionate), 1,3-propylene glycol-bis(2-mercaptoacetate), 1,3-propylene glycol-bis(3-mercaptopropionate), tris(hydroxymethyl)methane-tris(2-mercaptoacetate), tris(hydroxymethyl)methane-tris(3-mercaptopropionate), 1,1,1-tris(hydroxymethyl)ethane-tris(2-mercaptoacetate), 1,1,1-tris(hydroxymethyl)ethane-tris(3-mercaptopropionate), 1,1,1-trimethylolpropane-tris(2-mercaptoacetate), ethoxylated 1,1,1-trimethylolpropane-tris(2-mercaptoacetate), propoxylated 1,1,1-trimethylolpropane-tris(2-mercaptoacetate), 1,1,1-trimethylolpropane-tris(3-mercaptopropionate), ethoxylated 1,1,1-trimethylolpropane-tris(3-mercaptopropionate), propoxylated trimethylolpropane-tris(3-mercaptopropionate), 1,1,1-trimethylolpropane -tris(3-mercaptobutyrate), pentaerythritol-tris(2-mercaptoacetate), pentaerythritol-tetrakis(2-mercaptoacetate), pentaerythritol-tris(3-mercaptopropionate), pentaerythritol-tetrakis(3-mercaptopropionate), pentaerythritol-tris(3-mercaptobutyrate), pentaerythritol-tetrakis(3-mercaptobutyrate), Capcure® 3-800 (BASF), GPM-800 (Gabriel Performance Products), Capcure® LOF (BASF), GPM-800LO (Gabriel Performance Products), KarenzMT PE-1 (Showa Denko), 2-ethylhexylthioglycolate, iso-octylthioglycolate, di(n-butyl)thiodiglycolate, glycol-di-3-mercaptopropionate, 1,6-hexanedithiol, ethylene glycol-bis(2-mercaptoacetate) and tetra(ethylene glycol)dithiol.

The thiol-functionalized compound may be used alone or as a mixture of two or multiple different thiol-functionalized compounds.

Similar to the compound having one or multiple reactive carbon multiple bonds, the degree of cross-linking of the binding agent, and thus, the strength of the resultant coating, as well as its elastic properties may be adjusted, depending on the functionality of the thiol compound. At the same time, this has a direct influence on the expansion of the ash crust achievable in the event of fire.

The reaction between the at least one radically polymerizable compound having one or multiple reactive carbon multiple bonds and the at least one thiol-functionalized compound is started by a radical initiator.

The radical initiators under consideration in this case are all compounds known to those skilled in the art, which form radicals induced by radiation, as a result of thermal or catalytic decay. The radical initiator is preferably a compound, which is formed as a result of thermal or catalytic decay. The radical initiator is particularly preferably a compound, which forms radicals as a result of catalytic decay.

Examples of photoinitiators include benzoin and substituted derivatives thereof, benzophenones, 4,4'-bis(dimethylamino)benzophenone, dialkoxybenzophenones, dialkoxyacetophenones, peroxyesters, as they are described in U.S. Pat. Nos. 4,616,826 and 4,604,295. For example, the following compounds may be mentioned: benzophenone, acetophenone, acenapthenequinone, o-methoxybenzophenone, thioxanthene-9-one, xanthene-9-one, 7H-benz[de]anthracene-7-one, dibenzosuberone, 1-napthaldehyde, 4,4'-bis (dimethylamino)benzophenone, fluorene-9-one, 1'-acetonaphthone, 2'-acetonaphthone, anthraquinone, 1-indanone, 2-tert-butylanthraquinone, valerophenone, hexanophenone, 8-phenylbutyrophenone, p-morpholinopropiophenone, 4-morpholinobenzophenone, 4'-morpholinodeoxybenzoin-p-diacetylbenzene, 4'-methoxyacetophenone, benzaldehyde, 9-acetylphenanthrene, 2-acetylphenanthrene, 10-thioxanthenone, 3-acetylphenanthrene, 3-acetylindole, 1,3,5-triacetylbenzene and mixtures thereof.

Thermal radical initiators include peroxides, azonitriles and similar radical initiators known to those skilled in the art, peroxides being preferred.

The peroxides used for initiating the hardening reaction may be any peroxides known to those skilled in the art for use in hardening unsaturated compounds. Such peroxides contain organic and inorganic peroxides, either solid or liquid. Hydrogen peroxide may also be used. Examples of suitable peroxides are peroxycarbonates (of the formula —OC(O)OO—); peroxyesters (of the formula —C(O)OO—), diacylperoxides (of the formula —C(O)OOC(O)—), dialkylperoxides (of the formula —OO—) and the like. These may also be of an oligomeric or polymeric nature. An extensive list of examples of suitable peroxides may be found, for example, in US 2002/0091214 A1, paragraph [0018].

The peroxide is preferably a hydroperoxide, a perether, a perester, a peranhydride or a percarbonate, more preferably the peroxide is selected from the group of percarbonates, peresters and hydroperoxides, and most preferably the peroxide is a monopercarbonate, such as, for example, tert-butylperoxy-2-ethylhexylcarbonate, or a perester, such as, for example, tert-butylperoxybenzoate.

The composition according to the present invention preferably includes a transition metal compound as an accelerator or hardening catalyst. The presence of such a transition metal compound is advantageous, in that it accelerates the decay of the peroxide and, therefore, the curing of the resin composition. The transition metal is preferably selected from among the transition metals, the atomic numbers of which extend from an atomic number in the range of 22 through 29 or an atomic number in the range of 38 through 49, or an atomic number in the range of 57 through 79. The transition metal is most preferably selected from among V, Mn, Cu, Fe.

In addition, the compound may contain a co-accelerator, such as 1,3-dicarbonyl compounds, for example, 1,3-diketones and aldehydes, in particular, acetylacetone, benzoylacetone and dibenzoylmethane; monoesters and diesters, in particular, diethylmalonate and succinates, acetoacetates, such as ethylacetoacetate, acetoxyacetylethylmethacrylate and the like, in order, if necessary, to increase the reactivity.

According to the present invention, the component C contains an insulating layer-forming additive, the additive possibly including both individual compounds as well as a mixture of multiple compounds.

Insulating layer-forming additives used are advantageously of the kind which, when exposed to heat, act by forming an expanded, insulating layer from a flame-retardant material, which protects the substrate from overheating, and thus prevents or at least slows the change of the components bearing the mechanical and static properties caused by exposure to heat. The formation of a voluminous, insulating layer, namely, an ash layer, may be formed by the chemical reaction of a mixture of compounds appropriately matched to one another, which react with one another when exposed to heat. Such systems are known to those skilled in the art by the term chemical intumescence, and may be used in accordance with the present invention. Alternatively, the voluminous, insulating layer may be formed by physical intumesence. Both systems may each be used according to the present invention alone or together in combination.

To form an intumescent layer by chemical intumescence, at least three components are generally required: a carbon source, a dehydrogenation catalyst and a propellant, which are contained, for example, in coatings in a binding agent. When exposed to heat, the binding agent softens and the fire protection additives are released, so that they are able to react with one another in the case of chemical intumescence, or are able to expand in the case of physical intumesence. The acid, which is formed by thermal decomposition from the dehydrogenation catalyst, serves as a catalyst for the carbonification of the carbon source. At the same time, the propellant thermally decomposes while forming inert gases, which causes an expansion of the carbonized (burnt) material and, optionally, the softened binding agent, while forming a voluminous insulating foam.

In one specific embodiment of the present invention, in which the insulating layer is formed by chemical intumescence, the insulating layer-forming additive includes at least one carbon skeleton former, if the binding agent cannot be used as such, at least one acidifier, at least one propellant, and at least one inorganic skeleton former. The components of the additive are selected, in particular so that they are able to develop a synergy, some of the compounds being able to perform multiple functions.

The carbon sources under consideration are the compounds generally used in intumescent fire protection formulations and known to those skilled in the art, such as starch-like compounds, for example, starch and modified starch and/or polyvalent alcohols (polyols), such as saccharides and polysaccharides and/or a thermoplastic or duroplastic polymeric resin binder, such as a phenolic resin, a urea resin, a polyurethane, polyvinylchloride, poly(meth)acrylate, polyvinylacetate, polyvinylalcohol, a silicone resin and/or a rubber. Suitable polyols are polyols from the group sugar, pentaerythritol, dipentaerythritol, tripentaerythritol, polyvinylacetate, polyvinylalcohol, sorbitol, polyoxyethylene-/polyoxypropylene-(EO-PO-) polyols. Pentaerythritol, dipentaerythritol or polyvinylacetate are preferably used.

It is noted that in the event of fire, the binding agent itself may also have the function of a carbon source.

The dehydrogenation catalysts and acidifiers under consideration are the compounds normally used in intumescent fire protection formulations and known to those skilled in the art, such as a salt or an ester of an inorganic, non-volatile acid, selected from among sulfuric acid, phosphoric acid or boric acid. Primarily, phosphorous compounds are used, which have a very wide range, since they extend over multiple oxidation stages of the phosphorous, such as phosphines, phosphine oxides, phosphonium compounds, phosphates, elementary red phosphorous, phosphites and phosphates. The following phosphoric acid compounds may be mentioned by way of example: monoammonium phosphate, diammonium phosphate, ammonium phosphate, ammonium polyphosphate, melamine phosphate, melamine resin phosphates, potassium phosphate, polyol phosphates such as, for example, pentaerythritol phosphate, glycerin phosphate, sorbitol phosphate, mannitol phosphate, dulcitol phosphate, neopentylglycol phosphate, ethylene glycol phosphate, dipentaerythritol phosphate and the like. The phosphoric acid compound used is preferably a polyphosphate or an ammonium polyphosphate. Melamine resin phosphates in this case are understood to mean compounds, such as reaction products of lamelite C (melamine-formaldehyde-resin) having phosphoric acid. Sulfuric acid compounds to be mentioned, by way of example, are: ammonium sulfate, ammonium sulfamate, nitroaniline bisulfate, 4-nitroaniline-2-sulfonic acid and 4,4-dinitrosulfanilamide and the like. Melamine borate, for example, may be mentioned as a boric acid compound.

The propellants under consideration are the compounds normally used in fire protection formulations and known to those skilled in the art, such as cyanuric acid or isocyanuric acid and derivatives thereof, melamine and derivatives thereof. These are cyanamide, dicyanamide, dicyandiamide, guanidine and salts thereof, biguanide, melamine cyanurate, cyanic acid salts, cyanic acid esters and -amides, hexamethoxymethyl melamine, dimelamine pyrophosphate, melamine polyphosphate, melamine phosphate. Hexamethoxymethyl melamine or melamine (cyanuric acid amide) is preferably used.

Also suitable are components which do not limit their mode of action to one single function, such as melamine polyphosphate, which acts both as an acidifier as well as a propellant. Additional examples are described in GB 2 007 689 A1, EP 139 401 A1 and U.S. Pat. No. 3,969,291 A1.

In one specific embodiment of the present invention, in which the insulating layer is formed by physical intumescence, the insulating layer-forming additive includes at least one thermally expandable compound, such as, for example, a graphite intercalation compound, also known as expandable graphite. These may also be incorporated in the carrier material.

Under consideration as the expandable graphite are, for example, known intercalation compounds of $SO_x$, $NO_x$, halogen and/or strong acids in graphite. These are also referred to as graphite salts. Expandable graphites, which emit $SO_2$, $SO_3$, $NO$ and/or $NO_2$ at temperatures of, for example, 120 to 350° during expansion, are preferred. The expandable graphite may be present, for example, in the form of platelets having a maximum diameter in the range of 0.1 to 5 mm. This diameter lies preferably in the range of 0.5 to 3 mm. Expandable graphites suitable for the present invention are commercially available. In general, the expandable graphite particles are distributed uniformly in the fire protection elements according to the present invention. However, the concentration of the expandable graphite particles may also vary, e.g., in point, pattern, sheet and/or sandwich form. Reference is made in this regard to EP 1489136 A1, the content of which is incorporated by reference in this application.

In another specific embodiment of the present invention, the insulating layer is formed both by chemical as well as by physical intumesence, so that the insulating layer-forming additive includes a carbon source, a dehydrogenation catalyst and a propellant, as well as thermally expandable compounds.

At least one ash crust stabilizer is preferably added to the above-listed components, since the ash crust formed in the event of fire is generally unstable and, depending on the thickness and structure thereof, may be dispersed by air currents, for example, which adversely impacts the insulating effect of the coating.

The ash crust stabilizers or skeleton formers under consideration are the compounds normally used in fire protection formulations and known to those skilled in the art, for example, expandable graphite and particulate metals, such as aluminum, magnesium, iron and zinc. The particulate metal may be present in the form of a powder, of platelets, flakes, fibers, threads and/or whiskers, the particulate metal in the form of powder, platelets or flakes having a particle size of ≤50 μm, preferably of 0.5 to 10 μm. When using the particulate metal in the form of fibers, threads and/or whiskers, a thickness of 0.5 to 10 μm and a length of 10 to 50 μm are preferred. Alternatively or in addition, an oxide or a compound of a metal of the group including aluminum, magnesium, iron or zinc may be used as an ash crust stabilizer, in particular iron oxide, preferably iron trioxide, titanium dioxide, a borate, such as zinc borate and/or a glass frit made of low melting glasses having a melting temperature preferably at or above 400° C., phosphate or sulphate glasses, melamine polyzinc sulfates, ferro glasses or calcium borosilicates. The addition of such an ash crust stabilizer contributes to a significant stabilization of the ash crust in the event of fire, since these additives increase the mechanical strength of the intumescent layer and/or prevent their draining off. Examples of such additives are also found in U.S. Pat. Nos. 4,442,157 A, 3,562,197 A, GB 755 551 A and EP 138 546 A1.

Ash crust stabilizers, such as melamine phosphate or melamine borate, may also be included.

One or multiple reactive flame retardants may optionally also be added to the composition according to the present invention. Such compounds are incorporated in the binding agent. One example within the meaning of the invention are reactive organophosphorous compounds, such as 9,10-dihydro-9-oxa-10-phosphaphenanthrene-10-oxide (DOPO) and derivatives thereof, such as, for example, DOPO-HQ, DOPO-NQ, and adducts. Such compounds are described, for example, in S. V. Levchik, E. D. Weil, *Polym. Int.* 2004, 53, 1901-1929.

The insulating layer-forming additive may be contained in the compound in an amount of 30% to 99% by weight, the amount depending essentially on the mode of application of the composition (spraying, painting and the like). In order to achieve an advantageously high rate of intumescence, the ratio of component C in the overall formulation is set as high as possible. The proportion of component C in the overall formula is preferably 35% to 85% by weight, and particularly preferably 40% to 85% by weight.

In addition to the insulating layer-forming additives, the composition may optionally also contain conventional auxiliary agents, such as solvents, for example, xylene or toluene, wetting agents based on polyacrylates and/or polyphosphates, defoamers, such as silicone defoamers, thickeners, such as alginate thickeners, dyes, fungicides, softeners, such as chlorinated waxes, binders, flame retardants or various fillers, such as vermiculite, inorganic fibers, quartz sand, micro glass beads, mica, silicon dioxide, mineral wool and the like.

Additional additives, such as thickeners, rheology additives and fillers may be added to the composition. Rheology additives used, such as anti-settling agents, anti-sag agents and thixotropic agents, are preferably polyhydroxy carbonic acid amides, urea derivatives, salts of unsaturated carbonic acid esters, alkyl ammonium salts of acidic phosphoric acid derivatives, ketoximes, amine salts of the p-toluene sulfonic acid, amine salts of sulfonic acid derivatives, as well as aqueous or organic solutions or mixtures of the compounds. Rheology additives on the basis of pyrogenic or precipitated silicas or on the basis of silanized pyrogenic or precipitated silicas may also be used. The rheology additives are preferably pyrogenic silicates, modified and unmodified layer silicates, precipitated silicas, cellulose ethers, polysaccharides, PU and acrylate thickeners, urea derivatives, castor oil derivatives, polyamides, and fatty acid amides and polyolefins, if present in solid form, pulverized celluloses and/or suspension agents, such as, for example, xanthan gum.

The composition according to the present invention may be packaged as a two-component system or multicomponent system.

In one preferred specific embodiment of the present invention, the composition according to the present invention is packaged as a two-component system, the component A and the component B being situated separately in a reaction-inhibiting manner. Accordingly, a first component, the component I, contains the component A and a second component, the component II, contains the component B. This ensures that the two components A and B of the binding agent are combined only just prior to application and trigger the hardening reaction. This makes the system easier to use.

The unsaturated compound in this case is preferably contained in component I in an amount of 2% to 95% by weight.

A reactive diluent, if it is used, is contained in component I in an amount of 90% to 10% by weight, preferably 70% to 10% by weight The thiol-functionalized compound is contained in component II preferably in an amount of 0.5% to 90% by weight, more preferably in an amount of 2% to 85% by weight, and most preferably in an amount of 4% to 75% by weight.

An inhibitor, if it is used, may be contained in component I in an amount of 0.001% to 1% by weight, preferably 0.01% to 0.5% by weight and more preferably 0.03% to 0.35% by weight, relative to the compound with reactive carbon multiple bonds having one or more reactive C—C double bonds or C—C triple bonds per molecule (component A).

If the radical initiator is a mixture of a peroxide, an accelerator and, optionally, a co-accelerator or catalyst, then the accelerator and the co-accelerator or catalyst are advantageously situated separately from the peroxide in a reaction-inhibiting manner. In the preferred two-component system, this means that the accelerator and, optionally, the co-accelerator or the catalyst are contained together with component A in component I.

The two-component system preferably includes component A and component B separated in a reaction-inhibiting manner in different containers, for example, a multi-chamber device, such as, for example, a multi-chamber cartridge, from which containers the two components are pressed out and intermixed as a result of the effect of mechanical pressing forces or under the effects of a gas pressure.

Component C in this case may be contained as a total mixture or divided into individual components in a first component I and/or in a second component II. The division of component C takes place depending on the compatibility of the compounds contained in the composition, so that neither a reaction between the compounds contained or a reciprocal disruption, nor a reaction of these compounds with the compounds of the other components may occur. This depends on the compounds used.

The insulating layer-forming additive is preferably divided among component I and component II in such a way that component I contains at least a portion of the carbon source and at least one propellant, and component II optionally contains a portion of the carbon source and at least one acidifier. If at least one ash crust stabilizer is contained in the composition, it may be contained either in component I or in component II, or may be divided in a suitable manner among both components I and II.

This ensures that an advantageously high proportion of filler may be obtained. This results in a high intumescence, even in the case of small layer thicknesses of the composition.

The acidifier is contained in component II for reasons of storage stability. As mentioned previously above, stabilizers are added to compounds having C—C double bonds or C—C triple bonds to enhance storage stability. It is known that Tempol, for example, is not acid-stable, and decomposes in the presence of acid traces. This may severely affect the storage stability. The dehydrogenation catalyst, i.e., the acidifier, which may contain acid traces as a result of the manufacturing process, is therefore stored preferably separately from component I.

The composition is applied as a paste with a brush, with a roller or by spraying it on the substrate, in particular metal substrate. The composition is preferably applied with the aid of an airless spray method.

The two-component or multi-component composition according to the present invention is distinguished by a very rapid curing as a result of radical polymerization and, therefore, unnecessary drying. This is very important, in particular, when the coated components must be rapidly stressed or further processed, whether as a result of coating with a cover layer or of a movement or of transporting of the components. The coating is also significantly less susceptible to external influences at the construction site, such as, for example, impact from (rain)water or dust or dirt which, in the case of solvent-based systems or water-based systems, may result in a leaching out of water-soluble components, such as the ammonium polyphosphate or, in the case of dust accumulation, in a reduced intumescence. Because of its low viscosity, the composition remains simple to process, despite the high solid content, in particular, using common spray methods. Due to the low softening point of the binding agent, and the high solid content, the expansion rate is high, even in the case of low layer thickness.

For this reason, the two-component or multi-component composition according to the present invention is suitable as a coating, in particular, as a fire protection coating, preferably sprayable coating for metallic and non-metallic based substrates. The substrates are not limited and include components, in particular, steel components and wooden components, but also single cables, cable bundles, cable lines and cable conduits or other lines.

The composition according to the present invention is used primarily in the construction sector as a coating, in particular as a fire protection coating for steel construction elements, but also for construction elements made of other materials, such as concrete or wood, as well as a fire protection coating for single cables, cable bundles, cable lines and cable conduits or other lines.

Thus, a further subject matter of the present invention is the use of the composition according to the present invention as a coating, in particular as a coating for construction elements or structural elements made of steel, concrete, wood and other materials, such as plastics, in particular as a fire protection coating.

The present invention also relates to objects obtained when the composition according to the present invention has cured. The objects have excellent insulation layer-forming properties.

The following examples serve to further explain the present invention.

EXEMPLARY EMBODIMENTS

The following components are used for preparing insulating layer-forming compositions according to the present invention:

In each case, component B together with the ammonium polyphosphate and component A together with the remaining compounds of component C are blended and homogenized with the aid of a dissolver. In this way, components II and I are obtained. For the application, these two mixtures (component I and II) are then mixed together and applied either before spraying or preferably during the spraying.

The curing behavior was observed in each case, the intumescence factor and the relative ash crust stability being subsequently determined. For this purpose, the mixtures were each placed in a round Teflon mold having a depth of approximately 2 mm and a diameter of 48 mm.

The time of curing in this case corresponds to the time after which the samples were fully hardened and could be removed from the Teflon mold.

To determine the intumescence factor and the relative ash crust stability, a muffle kiln was preheated to 600° C. A multiple measurement of the sample thickness was carried out with the caliper and the mean value $h_M$ was calculated. Each of the samples was then introduced into a cylindrical steel mold and heated in the muffle kiln for 30 min. After cooling to room temperature, the foam height $h_{E1}$ was first non-destructively determined (mean value of a multiple measurement). The intumescence factor I is calculated as follows:

Intumescence factor I: $I=h_{E1}:h_M$

Subsequently, a defined weight (m=105 g) was dropped from a defined height (h=100 mm) onto the foam in the cylindrical steel mold and the residual foam height $h_{E2}$ after this partially destructive impact was determined. The relative ash crust stability was calculated as follows:

relative ash crust stability (AKS): $AKS=h_{E2}:h_{E1}$

In addition, the shrinkage during "drying", i.e., the reaction of the two components, was measured.

For this purpose, a mold having a thickness of 10 mm was filled with each mixture. After curing, the molded bodies formed were removed from the mold and the thickness measured. The shrinkage is the product of the difference.

Example I

Component A

| Component | Amount [g] |
| --- | --- |
| 1,4-butanediol divinyl ether | 42.4 |
| Acetylacetone | 0.6 |
| Octa-Soligen ® Mangan 10[1] | 0.6 |
| TEMPOL[2] | 0.0288 |

[1]Mn(II)-octoate
[2]4-hydroxy-2,2,6,6-tetramethylpiperidine-N-oxyl

Component B

| Component | Amount [g] |
| --- | --- |
| Thiocure ® PETMP[3] | 72.8 |
| Trigonox ® C[4] | 3.6 |

[3]Pentaerythritol-tetra(3-mercaptopropionate)
[4]tert-butylperbenzoate, 55-% aqueous solution Component C

| Component | Amount [g] |
| --- | --- |
| Pentaerythrite 98% | 37.5 |
| Melamine | 37.5 |
| Exolit ® AP 422[5] | 71.1 |
| Titanium dioxide | 34.0 |

[5]Ammonium polyphosphate

After mixing of the three components, the mixture cured after 11 minutes to form a white polymeric solid.

Example 2

Component A

| Component | Amount [g] |
|---|---|
| 1,4-Cyclohexanedimethanol divinylether | 63.9 |
| Tempol | 0.0216 |
| Acetylacetone | 0.5 |
| Octa-Soligen ® Mangan 10 | 0.5 |

Component B

| Component | Amount [g] |
|---|---|
| Thiocure ® TMPMP[6] | 86.5 |
| Trigonox ® C | 4.8 |

[6]Trimethylolpropanetri(3-mercaptopropionate)

Component C

| Component | Amount [g] |
|---|---|
| Pentaerythrite 98% | 49.9 |
| Melamine | 49.9 |
| Exolit ® AP 422 | 94.8 |
| Titanium dioxide | 45.4 |

After mixing of the three components, the mixture cured after 10 minutes to form a white polymeric solid.

Example 3

Component A

| Component | Amount [g] |
|---|---|
| BVBI[7] | 38.3 |
| Tempol | 0.0288 |
| Acetylacetone | 0.6 |
| Octa-Soligen ® Mangan 10 | 0.6 |

[7]Bis[4-(vinyloxy)butyl]isophthalate

Component B

| Component | Amount [g] |
|---|---|
| Thiocure ® PETMP | 60.5 |
| Trigonox ® C | 94.8 |

Component C

| Component | Amount [g] |
|---|---|
| Pentaerythrite 98% | 49.9 |
| Melamine | 49.9 |
| Exolit ® AP 422[4] | 94.8 |
| Titanium dioxide | 54.4 |

After mixing of the three components, the mixture cured in 4 minutes to form a white polymeric solid.

The shrinkage in the case of all three compositions was less than 5.0%

Comparison Example 1

A commercial fire protection product (Hilti CFP S-WB) based on aqueous dispersion technology was used as a comparison.

Comparison Example 2

As an additional comparison, a standard epoxy amine system was used (Jeffamin® T-403, liquid, solvent-free and crystallization-resistant epoxy resin, made up of low molecular bisphenol A and bisphenol F-based epoxy resins (Epilox® AF 18-30, Leuna-Harze GmbH) and 1,6 hexanediol diglycidylether) which was tested, filled to 60% with an intumescent mixture similar to the examples above.

Comparison Example 3

As an additional comparison, a standard epoxy amine system was used (isophorone diamine, trimethylol propane triacrylate and liquid, solvent-free and crystallization-resistant epoxy resin, made up of low molecular bisphenol A and bisphenol F-based epoxy resin (Epilox® AF 18-30, Leuna-Harze GmbH)), which was tested, filled to 60% with an intumescent mixture similar to the examples above.

TABLE 1

Measurement results of the intumescence factor, the ash crust stability and the curing time

| Example | Intumescence factor I (multiple) | Relative ash crust stability AKS (multiple) | Sample thickness $h_M$ (mm) | Curing time |
|---|---|---|---|---|
| 1 | 28.7 | 0.94 | 1.8 | 11 minutes |
| 2 | 20.6 | 0.78 | 1.6 | 10 minutes |
| 3 | 24.1 | 0.60 | 1.4 | 4 minutes |
| Comparison example 1 | 36 | 0.62 | 1.8 | 10 days |
| Comparison example 2 | 22 | 0.04 | 1.6 | 12 hours |
| Comparison example 3 | 1.7 | 0.60 | 1.2 | 1 day |

The invention claimed is:

1. An insulating layer-forming composition comprising:
 a component A containing at least one compound having one or multiple reactive carbon multiple bonds per molecule;
 a component B containing at least one thiol-functionalized compound, the average number of thiol groups per molecule of which is at least 2, and a radical initiator; and
 a component C including a mixture, the mixture including at least one carbon source, at least one dehydrogenation catalyst and at least one propellant, or including at least expandable graphite.

2. The composition as recited in claim 1 wherein the at least one compound having the reactive carbon multiple bonds contains one or multiple C—C double bonds and is selected from among vinylesters, allylesters, vinylethers, allylethers, vinylamines, allylamines, vinylamides, esters and amides of (meth)acrylic acid, esters of fumaric acid, maleinimides.

3. The composition as recited in claim 2 wherein the at least one compound contains one or multiple C—C double bonds and is selected from among trimethylolpropane diallylether, pentaerythritol triallylether, pentaerythritol triacrylate, trimethylolpropane triacrylate, trimethylolpropane diallylether, phthalic acid diallylester, succinyl acid diallylester, succinic acid bis[4-(vinyloxy)butyl]ester, adipic acid bis[4-(vinyloxy)butyl]ester, isophthalic acid bis[4-(vinyloxy)butyl]ester, terephthalic acid bis[4-(vinyloxy)butyl]ester, trimellitic acid tris[4-(vinyloxy)butyl]ester, diethyleneglycol divinylether, 1,4-cyclohexanedimethanol divinyl ether, 1,4-butanediol divinylether, pentaerythritol allylether, 1,3,5-triallyl-1,3,5-triazine-2,4,6-trione and triallylamine.

4. The composition as recited in claim 1 wherein the at least one thiol-functionalized compound is a polythiol compound having at least three thiol groups per molecule.

5. The composition as recited in claim 1 wherein the thiol-functionalized compound is selected from the group consisting of glycol-bis(2-mercaptoacetate), glycol-bis(3-mercaptopropionate), 1,2- propylene glycol-bis(2-mercaptoacetate), 1,2-propylene glycol-bis(3-mercaptopropionate), 1,3-propylene glycol-bis(2-mercaptoacetate), 1,3-propylene glycol-bis(3-mercaptopropionate), tris(hydroymethyl)methane-tris(2-mercaptoacetate), tris(hydroxymethyl)methane-tris(3-mercaptopropionate), 1,1,1-tris(hydroxymethyl)ethane-tris(2-mercaptoacetate), 1,1,1-tris(hydroxymethyl)ethane-tris(3-mercaptopropionate), 1,1,1-trimethylolpropane-tris(2-mercaptoacetate), ethoxylated 1,1,1-trimethylolpropane-tris(2-mercaptoacetate), propoxylated 1,1,1-trimethylolpropane-tris(2-mercaptoacetate), 1,1,1-trimethylolpropane-tris(3-mercaptopropionate), ethoxylated 1,1,1-trimethylolpropane-tris(3-mercaptopropionate), propoxylated trimethylolpropane-tris(3-mercaptopropionate), 1,1,1-trimethylolpropane-tris(3-mercaptobutyrate), pentaerythritol-tris(2-mercaptoacetate), pentaerythritol-tetrakis(2-mercaptoacetate), pentaerythritol-tri s(3-mercaptopropionate), pentaerythritol-tetrakis(3-mercaptopropionate), pentaerythritol-tri s(3-mercaptobutyrate), pentaerythritol-tetrakis(3-mercaptobutyrate), Capcure 3-800 (BASF), GPM-800 (Gabriel Performance Products), Capcure LOF (BASF), GPM-800LO (Gabriel Performance Products), KarenzMT® PE-1 (Showa Denko), 2-ethylhexylthioglycolate, iso-octylthioglycolate, di(n-butyl)thiodiglycolate, glycol-di-3-mercaptopropionate, 1,6-hexanedithiol, ethyleneglycol-bis(2-mercaptoacetate) and tetra(ethylene glycol) dithiol.

6. The composition as recited in claim 1 wherein the radical initiator is an inorganic or organic peroxide.

7. The composition as recited in claim 1 further comprising a reactive diluent.

8. The composition as recited in claim 1 further comprising an accelerator.

9. The composition as recited in claim 8 wherein the accelerator is a combination of a 1,3-dicarbonyl compound and a metal salt.

10. The composition as recited in claim 1 further comprising an inhibitor.

11. The composition as recited in claim 1 wherein the component C also contains at least one ash crust stabilizer.

12. The composition as recited in claim 1 further comprising organic or inorganic auxiliary agents.

13. A method comprising:
applying the composition as recited in claim 1 as a coating.

14. The method as recited in claim 13 wherein the coating coats steel construction elements.

15. The method as recited in claim 13 wherein the coating coats metallic or non-metallic substrates.

16. The method as recited in claim 13 wherein the coating is a fire protection layer.

* * * * *